United States Patent
Bruls et al.

(10) Patent No.: US 10,310,277 B2
(45) Date of Patent: Jun. 4, 2019

(54) LIGHT EMITTING DEVICE WITH COOLING ELEMENTS

(71) Applicant: PHILIPS LIGHTING HOLDING B.V., Eindhoven (NL)

(72) Inventors: Dominique Maria Bruls, Eindhoven (NL); Vincent Stefan David Gielen, Eindhoven (NL); Georges Marie Calon, Eindhoven (NL); Mohammad Mirsadeghi, Eindhoven (NL); Leendert Van Der Tempel, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/571,128

(22) PCT Filed: Apr. 22, 2016

(86) PCT No.: PCT/EP2016/058982
§ 371 (c)(1),
(2) Date: Nov. 1, 2017

(87) PCT Pub. No.: WO2016/177586
PCT Pub. Date: Nov. 10, 2016

(65) Prior Publication Data
US 2018/0173002 A1    Jun. 21, 2018

(30) Foreign Application Priority Data
May 1, 2015  (EP) ...................................... 15166100

(51) Int. Cl.
*G02B 27/09*    (2006.01)
*F21V 8/00*    (2006.01)
(Continued)

(52) U.S. Cl.
CPC ........ *G02B 27/0994* (2013.01); *F21V 29/713* (2015.01); *G02B 6/00* (2013.01);
(Continued)

(58) Field of Classification Search
CPC .............. G02B 27/0994; G02B 6/0003; G02B 6/0006; G02B 6/0073; G02B 6/00; F21V 29/713; F21Y 2115/10
(Continued)

(56) References Cited

U.S. PATENT DOCUMENTS

| | | | |
|---|---|---|---|
| 8,525,999 B2 * | 9/2013 | Brukilacchio | ....... A61B 1/0653 356/432 |
| 2014/0062336 A1 * | 3/2014 | Hofmann | ........... A61B 1/00117 315/294 |
| 2016/0054501 A1 * | 2/2016 | Hikmet | ................ G02B 6/0003 362/606 |

FOREIGN PATENT DOCUMENTS

| | | |
|---|---|---|
| WO | WO2007122543 A2 | 11/2007 |
| WO | WO2008042703 A1 | 4/2008 |
| WO | WO2009021079 A1 | 2/2009 |

* cited by examiner

*Primary Examiner* — Ali Alavi
(74) *Attorney, Agent, or Firm* — Stephen M. Kohen

(57) ABSTRACT

A light emitting device (1) comprising a first light source (21) and a second light source (22), a luminescent element (4) comprising a first light input surface (41), a second light input surface (42), a light exit surface (43), a first further surface (44) and a second further surface (45), a first cooling assembly (5) and a second cooling assembly (6), the first cooling assembly (5) comprising a first cooling element (52) and a first light source board (51) on which one of the light sources is mounted, and the second cooling assembly (6) comprising a second cooling element (62) and a second light source board (61), on which the other one of the light sources is mounted, and the second cooling assembly (6)

(Continued)

being arranged with a surface (621) in mechanical and thermal contact with the first further surface (44) of the luminescent element thereby forming a first interface and the first cooling assembly (5) being arranged with a surface (521) in mechanical and thermal contact with the second further surface (45) of the luminescent element thereby forming a second interface, the first interface and the second interface comprising a flatness of less than 10 μm, and the root mean squared surface roughness, $R_{RMS}$, of the first further surface (44) and the second further surface (45) of the luminescent element being comprised in the interval $1\ \mu m < R_{RMS} < 5\ \mu m$.

15 Claims, 9 Drawing Sheets

(51) Int. Cl.
    *F21V 29/71*         (2015.01)
    *G02B 6/00*          (2006.01)
    *F21Y 115/10*       (2016.01)

(52) U.S. Cl.
    CPC ......... *G02B 6/0003* (2013.01); *G02B 6/0006* (2013.01); *G02B 6/0073* (2013.01); *F21Y 2115/10* (2016.08)

(58) Field of Classification Search
    USPC ........................................................ 362/255
    See application file for complete search history.

LIGHT EMITTING DEVICE WITH COOLING ELEMENTS

CROSS-REFERENCE TO PRIOR APPLICATIONS

This application is the U.S. National Phase application under 35 U.S.C. § 371 of International Application No. PCT/EP2016/058982, filed on Apr. 22, 2016, which claims the benefit of European Patent Application No. 15166100.6, filed on May 1, 2015. These applications are hereby incorporated by reference herein.

FIELD OF THE INVENTION

The invention relates to a light emitting device comprising a first light source and a second light source, a luminescent element, a first cooling assembly and a second cooling assembly.

BACKGROUND OF THE INVENTION

High intensity light emitting devices are interesting for various applications including spot lights and digital light projection. For this purpose it is possible to make use of so-called light concentrators where shorter wavelength light is converted to longer wavelengths in a highly transparent luminescent material. A rod of such a transparent luminescent material is illuminated by (e.g. blue) LEDs to produce longer wavelengths within the rod. Converted light (e.g. red, yellow or green, dependent on the composition of the luminescent rod) will be in the luminescent material in the waveguide mode if the luminescent material is sufficiently transparent, the surfaces of the rod are perfectly polished and the ambient has a significantly lower refractive index. The waveguided light can then be extracted from one of the exit surfaces leading to an intensity gain. The light output can be increased by incoupling of more light by making the waveguide longer and adding LEDs.

Because the light from the LEDs is converted inside the luminescent rod towards longer wavelengths, part of the impinging energy from the blue LEDs is converted into heat inside the luminescent rod, due to the involved Stokes shift. Therefore the luminescent rod will heat up during operation. The performance and efficiency of the light conversion process is dependent on the temperature of the luminescent rod, as thermal quenching, optical saturation levels and quantum efficiency are temperature dependent. This temperature dependence is largely determined by the exact material composition and e.g. doping levels of the luminescent rod. As a variety of materials are used for the luminescent rod, such as Ce doped YAG- and LuAG-like crystals, the performance of the high intensity light emitting device may show a very strong decrease with temperature. Therefore it is crucial to keep the luminescent rod temperature below a given threshold temperature, which may e.g. be 150° C. for a LuAG system (Green light source), or even lower for e.g. YGdAG systems (Orange/Red light source).

As single-sided illumination is less attractive than double-sided to achieve high light output intensities and as three-sided or four-sided illumination is hard to embody using LED-boards, the luminescent rod is typically illuminated from two opposite sides, leaving, perpendicular thereto, two opposite surfaces free to apply cooling.

In one approach the luminescent rod and the LEDs of such a high intensity light emitting device can be cooled each by its own cooling element, typically a heat sink or heat pipe. This, however, would result in four cooling interfaces to the surroundings, which in turn results in an excessively complex system. Consequently, such a system has turned out not to be appealing to customers.

Furthermore, it is desired to provide both optimum total internal reflection (TIR) at all 6 interfaces between the luminescent rod and the ambient, and optimum cooling of the luminescent rod from two opposite sides. On the one hand, to obtain optimum total internal reflection (TIR) at the interfaces between the luminescent rod and the ambient, a gap between the luminescent rod and the ambient having a thickness of more than 2 times the wavelength is required such as to obtain little or preferably no optical contact between the luminescent rod and the ambient. On the other hand for optimum cooling of the luminescent rod from two sides good thermal conductance to a cooling element, typically a heat sink or heat pipe, is required, and to obtain a high thermal conductance, $C=k/d$, the distance d between the luminescent rod and the heat sink must therefore be as small as possible.

U.S. Pat. No. 8,525,999 B2 describes a light emitting diode illumination system comprising a LED die with a central luminescent rod. Two high thermal conductivity boards are arranged on mutually opposite sides of the LED die. The LED die is cooled by means of two heat sinks arranged one on each of the two thermally conductive boards opposite to the LED die. The thermally conductive boards may e.g. be copper or aluminum core printed circuit boards. The connection between LED die, thermally conductive boards and heat sinks is not described any further.

Providing some kind of spacing element arranged between the respective heat sinks and the luminescent rod, such as e.g. the thermally conductive boards of U.S. Pat. No. 8,525,999 B2, construes an attempt at solving the problem of providing both optimum TIR at the interfaces between the luminescent rod and the ambient, and optimum cooling of the luminescent rod on two sides. However, such high intensity light emitting devices are complex devices and therefore also expensive to manufacture.

SUMMARY OF THE INVENTION

It is an object of the present invention to overcome this problem, and to provide a high intensity light emitting device with which both optimum TIR at the interfaces between the luminescent rod and the ambient, and optimum cooling of the luminescent rod on two sides may be obtained while also having a simple structure which is less complicated, smaller and lighter and therefore also less expensive to manufacture.

According to a first aspect of the invention, this and other objects are achieved by means of a light emitting device comprising a first light source and a second light source, the first light source and the second light source being adapted for, in operation, emitting first light with a first spectral distribution, a luminescent element comprising a first light input surface, a second light input surface, a light exit surface extending in an angle different from zero to both the first light input surface and the second light input surface, a first further surface and a second further surface, the luminescent element being adapted for receiving the first light with the first spectral distribution at the first light input surface and the second light input surface, converting at least a part of the first light with the first spectral distribution to second light with a second spectral distribution, guiding the second light with the second spectral distribution to the light exit surface and coupling the second light with the second spectral distribution out of the light exit surface, the light emitting device further comprising a first cooling assembly and a second cooling assembly, the first cooling assembly comprising a first cooling element and a first light source board on which one of the first light source and the second light source is mounted, and the second cooling assembly comprising a second cooling element and a second light source board on which the other one of the first light source and second light source is mounted, and one of the first cooling assembly and the second cooling assembly being arranged with a surface in mechanical and thermal contact with the first further surface of the luminescent element thereby forming a first interface and the other of the first cooling assembly and the second cooling assembly being arranged with a surface in mechanical and thermal contact with the second further surface of the luminescent element thereby forming a second interface, the first interface and the second interface comprising a flatness of less than 10 µm, and the root mean squared surface roughness, $R_{RMS}$, of the first further surface and the second further surface of the luminescent element being comprised in the interval 1 µm<$R_{RMS}$<5 µm.

By providing a light emitting device comprising a first cooling assembly and a second cooling assembly, the first cooling assembly comprising a first cooling element and a first light source board on which one of the first light source and the second light source is mounted, and the second cooling assembly comprising a second cooling element and a second light source board on which the other one of the first light source and second light source is mounted, and one of the first cooling assembly and the second cooling assembly being arranged with a surface in mechanical and thermal contact with the first further surface of the luminescent element thereby forming a first interface and the other of the first cooling assembly and the second cooling assembly being arranged with a surface in mechanical and thermal contact with the second further surface of the luminescent element thereby forming a second interface, a light emitting device is provided with a particularly simple and durable construction with which an improved optical and thermal performance may be obtained while the luminescent element may still be cooled from two sides rather than one, and while the number of thermal interface planes (and cooling elements, like heat sinks) is still limited to two. Such a light emitting device thus has a structure which is less complicated and therefore also less expensive to manufacture.

By providing a light emitting device with the first interface and the second interface comprising a flatness of less than 10 µm, and with the root mean squared surface roughness, $R_{RMS}$, of the first further surface and the second further surface of the luminescent element being comprised in the interval 1 µm<$R_{RMS}$<5 µm, a light emitting device is provided with which both optimum TIR at the interfaces between the luminescent rod and the ambient, and optimum cooling of the luminescent rod on two sides is obtained. In this way, the thermal performance of such a light emitting device is sufficient to ensure that the temperature of the luminescent element is kept below e.g. 150° C., even at extreme operating conditions. Furthermore, optical contact between the luminescent element and the respective first and second cooling assemblies, and thereby any loss of light related thereto, is limited. Thus, it is assured that the light remains inside the luminescent element, and evanescent leakage to the cooling interfaces is prevented.

In an embodiment the first interface and the second interface each may comprise a flatness of less than 5 µm. Alternatively the first interface and the second interface may comprise a flatness of less than 9 µm or less than 8 µm or less than 7 µm or less than 6 µm or less than 4 µm.

In an embodiment the surface roughness of the first further surface and the second further surface of the luminescent element may be comprised in the interval 1.5 µm<$R_{RMS}$<5 µm or in the interval 1 µm<$R_{RMS}$<4.5 µm or in the interval 2 µm<$R_{RMS}$<5 µm or in the interval 1 µm<$R_{RMS}$<4 µm or in the interval 2 µm<$R_{RMS}$<4 µm.

In an embodiment, at least the surface of the one of the first cooling assembly and the second cooling assembly in mechanical and thermal contact with the first further surface or the second further surface at the first interface or the second interface, respectively, is arranged with a polymeric coating. In this embodiment, the surface of the cooling assembly which is in mechanical and thermal contact with the first further surface of the luminescent element, for example the surface of the first cooling assembly arranged at the first interface, or the surface of the cooling assembly which is in mechanical and thermal contact with the second further surface of the luminescent element, for example the surface of the second cooling assembly arranged at the second interface, is coated with a polymer. With this embodiment, a polymer coating is provided at the surface of the first cooling assembly (e.g. the first cooling element) forming an interface with the luminescent element. Similarly, a polymer coating may be provided at the surface of the second cooling assembly (e.g. the second cooling element) forming an interface with the luminescent element. It will be appreciated that the polymer coating may be provided at either one or both of the surface of the first cooling assembly and the surface of the second cooling assembly being in thermal and mechanical contact with the luminescent material.

In an embodiment, the polymeric coating may be fluorinated. In other words, the material provided at the surface of the first cooling assembly or the surface of the second cooling assembly in thermal and mechanical contact with the first further surface or the second further surface of the luminescent element may be a fluorinated polymer. For example, it can be any one of polytetrafluoroethylene (PTFE), perfluoroalkoxy resin (PFA) or fluorinated ethylene propylene (FEP).

In an embodiment, the first cooling assembly and the second cooling assembly may have similar heat dissipation capabilities.

In an embodiment, the first cooling element of the first cooling assembly and the second cooling element of the second cooling assembly may have similar structural shapes.

In an embodiment, the first cooling element of the first cooling assembly and the second cooling element of the second cooling assembly may be structurally symmetrical relative to the luminescent element. For example the cooling elements may have the same shape on each side of the luminescent element.

In an embodiment one of the first cooling assembly and the second cooling assembly may be arranged with a surface mechanically and thermally attached to the first further surface of the luminescent element, and wherein the other of the first cooling assembly and the second cooling assembly is arranged with a surface mechanically and thermally attached to the second further surface of the luminescent element. Thereby a light emitting device is obtained which has a particularly simple and durable structure and which is also smaller and lighter.

In an embodiment the first cooling element is mechanically and thermally attached to the first light source board and the second cooling element is mechanically and thermally attached to the second light source board. Thereby a light emitting device is obtained which has a structure being further simplified and even more durable.

In an embodiment a thermal interface material (TIM) layer, a thermal grease material layer or a phase-change material (PCM) layer is provided between one or more of a) at least one of the first light source board and the first cooling element and the second light source board and the second cooling element and b) the luminescent element and at least one of the first cooling element and the second cooling element.

Option a) provides for a light emitting device in which imperfections on the contact surfaces between the respective first and second light source boards on the one hand and the respective first and second cooling assemblies on the other hand may be smoothened out thereby optimizing the mechanical and thermal contact.

Option b) provides for a light emitting device in which imperfections on the interfaces between the luminescent element and the respective first and second cooling assemblies may be smoothened out thereby optimizing the mechanical and thermal contact.

In an embodiment the first cooling assembly and the second cooling assembly are adapted for providing a clamping force on the luminescent element. Thereby a light emitting device is obtained with which the mechanical and thermal contact between the luminescent element and the respective first and second cooling assemblies is further optimized.

In an embodiment the light emitting device further comprises at least one guiding element adapted for aligning the first cooling assembly and the second cooling assembly with respect to the luminescent element and at least one spring element adapted for providing a clamping force on the luminescent element. Thereby a light emitting device in which the first cooling assembly and the second cooling assembly are aligned with respect to the luminescent element and a clamping force is exerted on the luminescent element in a particularly simple way, thus keeping the structure of the light emitting device simple.

In an embodiment the clamping force is in the range of 0.1 N/mm$^2$ to 2 N/mm$^2$. An example within this range is a clamping force of 10 N to 100 N for a clamping surface of 60 mm$^2$. In another embodiment the clamping pressure is in the range of 1.7 bar to 17 bar.

Such a clamping force or clamping pressure has been shown to provide a particularly good mechanical and thermal contact between the luminescent element and the respective first and second cooling assemblies.

In an embodiment at least one of the first light input surface, the second light input surface and the light exit surface of the luminescent element are polished to obtain at least a P3 polishing quality. In another embodiment all surfaces of the luminescent element are polished to obtain at least a P3 polishing quality.

Thereby a light emitting device is provided with which optimum TIR properties of the luminescent element are obtained. A P3 polishing quality corresponds to the presence of a number of defects N of 3<N<16 or put in another way an approximate roughness of less than 2.

In an embodiment at least one of the first light source board and the second light source board comprises a copper core or a ceramic core. Thereby the light emitting device is provided with light source boards having particularly high heat conductivity.

In an embodiment the first cooling element and the second cooling element are metallic heat sink elements. Thereby the light emitting device is provided with particularly efficient cooling elements having particularly high heat conductivity.

In an embodiment at least a part of at least one of the first cooling element and the second cooling element comprises a metallic coating.

In an embodiment the metallic coating comprises a thickness of at least 100 200 nm.

In an embodiment the metallic coating is an aluminum or silver alloy coating.

Thereby a light emitting device is provided with which light propagating within the luminescent element will be reflected to a particularly high degree at the interfaces between the luminescent element and the respective first and second cooling assemblies, thereby minimizing the loss of light at these interfaces. Furthermore, this metallic coating also enables recycling of non-converted light originating from the light sources on both light source boards.

In an embodiment the light emitting device further comprises an alignment element adapted for providing an optical interface to an external device. Thereby a light emitting device is provided which has enhanced mechanical stability and provided with an optical reference plane with respect to the external device such as to enable coupling the light emitting device to the external device, such as an optical engine of a digital projector, in a particularly simple way.

In an embodiment at least one of the first light source board and the second light source board comprises a heat sink element. Thereby a light emitting device is provided with which the cooling of not only the luminescent element but also the first and second light source boards is further enhanced.

The invention further relates to a lamp, a luminaire, or a lighting system comprising a light emitting device according to any one of the previous embodiments, the lamp, luminaire and system being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

In an embodiment, the system may further comprise a compound parabolic concentrator (CPC) optically coupled to the light exit surface of the light emitting device. In a particular embodiment, an exit window of the CPC may be connected to another device (or external device) via an intermediate element, wherein the intermediate element comprises at least three contact points to contact the light exit surface and at least three contact points to contact the other device (or external device).

In an embodiment the intermediate element may act as a spring. The intermediate element may for example be circularly shaped.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

FIG. 5 shows the resulting temperatures of the luminescent element at certain board element temperatures.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
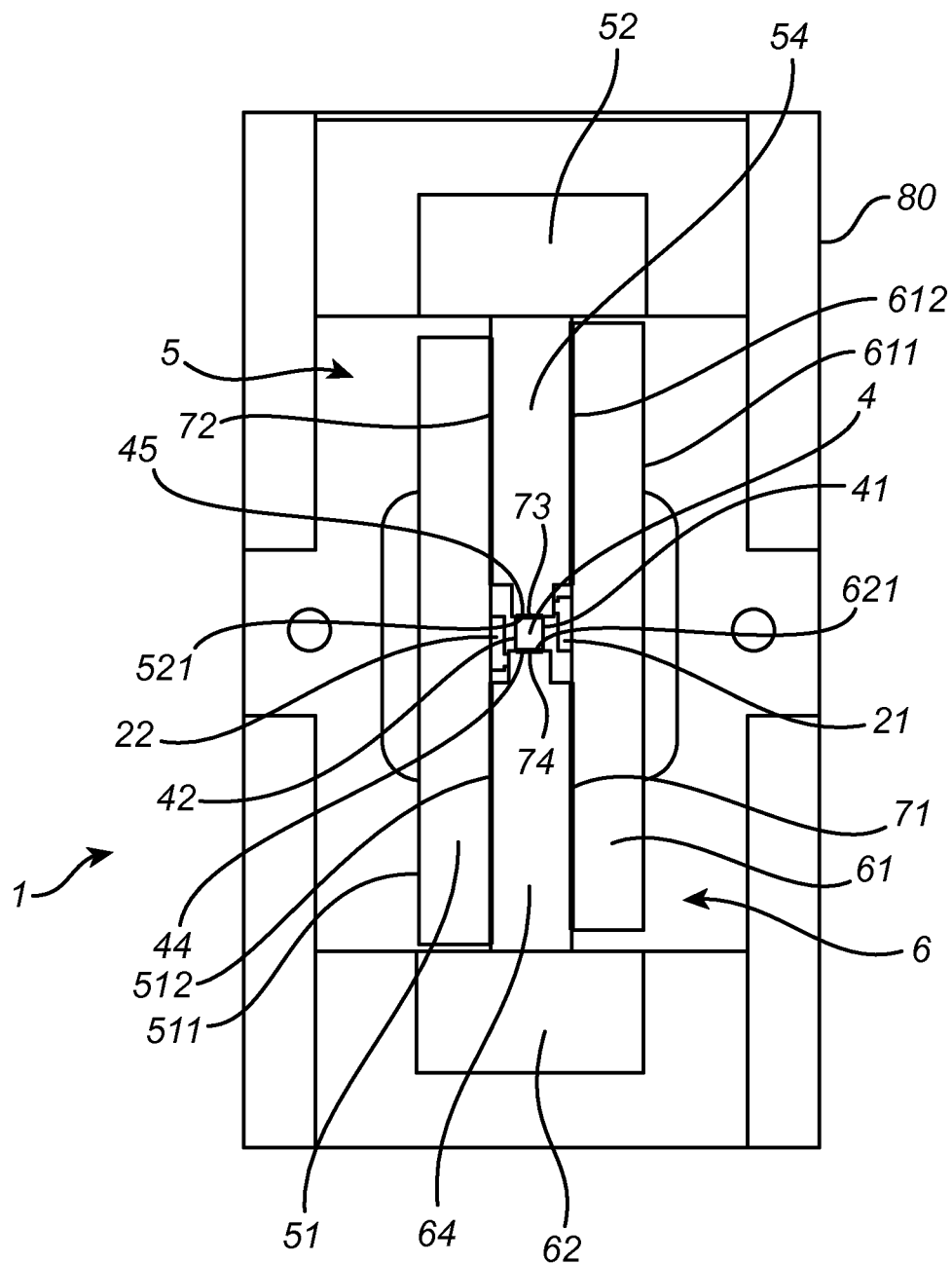
FIG. 1 shows a side view of a light emitting device according to the invention.
Figure 2:
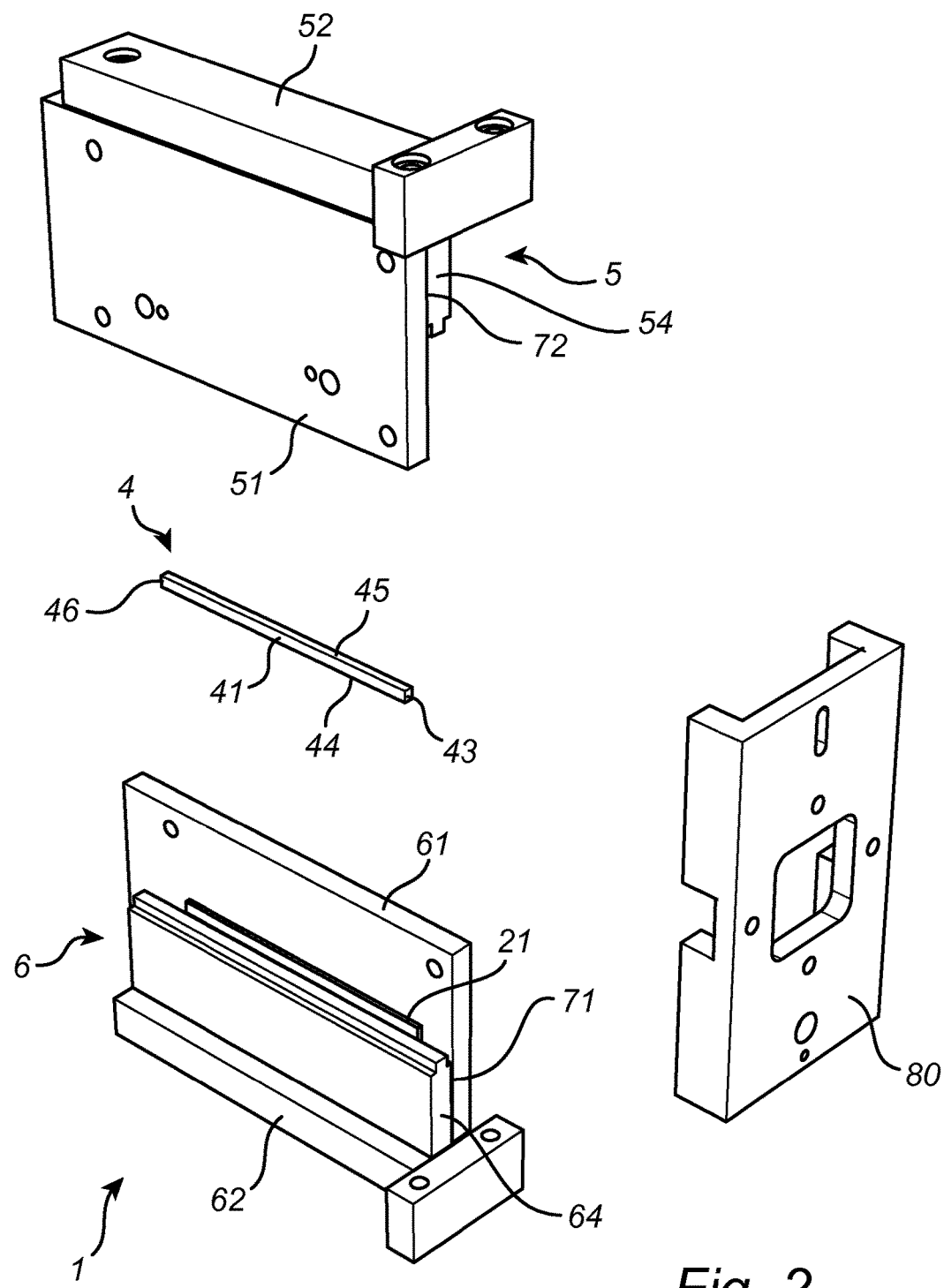
FIG. 2 shows an exploded view of the light emitting device according to FIG. 1.

Referring now to FIGS. 1 and 2, a light emitting device 1 according to a first embodiment of the invention is shown. FIG. 1 shows a side view and FIG. 2 shows an exploded view of the light emitting device 1 according to an embodiment of the invention. The light emitting device 1 comprises a first light source 21 and a second light source 22. The first light source 21 and the second light source 22 are adapted for, in operation, emitting first light with a first spectral distribution.

In one embodiment, the first light source 21 and the second light source 22 are adapted for emitting light with a spectral distribution within the blue wavelength range. The first light source 21 and the second light source 22 may also be adapted for emitting light with another spectral distribution, such as e.g. a spectral distribution within the green, red or UV wavelength range. In one embodiment, the first light source 21 and the second light source 22 are LEDs.

Furthermore, the first light source 21 and the second light source 22 are adapted for emitting light with one and the same spectral distribution. The first light source 21 and the second light source 22 may for instance be adapted for emitting blue light. Alternatively, the first light source 21 and the second light source 22 may be adapted for emitting light with mutually different spectral distributions.

The light emitting device 1 further comprises a luminescent element 4. The luminescent element 4 is shown shaped generally as a rod and comprises a first light input surface 41, a second light input surface 42 and a light exit surface 43 extending in an angle different from zero to both the first light input surface 41 and the second light input surface 42. The luminescent element 4 further comprises a first further surface 44 and a second further surface 45. The luminescent element 4 may also be shaped e.g. as a bar or a plate.

The first light source 21 and the second light source 22 may be LED strings extending along the surface of their respective light source board, i.e. extending along a light input surface (or lateral side) 41 or 42 of the luminescent element 4 such that light may be generated at different positions along these light input surfaces 41 and 42 of the luminescent element 4.

At least one of the first light input surface 41, the second light input surface 42 and the light exit surface 43 of the luminescent element are polished to obtain a high surface quality with low absorption and high specular reflectivity. In one embodiment the first light input surface 41, the second light input surface 42 and the light exit surface 43 of the luminescent element are polished to obtain at least a P3 polishing quality. In this connection it is noted that a P3 polishing quality corresponds to the presence of a number of defects N of 3<N<16 or put in another way an approximate roughness of less than 2.

The luminescent element 4 in essence functions as a light guide and is adapted for receiving the first light with the first spectral distribution at the first light input surface 41 and at the second light input surface 42, converting at least a part of the first light with the first spectral distribution to second light with a second spectral distribution, guiding the second light with the second spectral distribution to the light exit surface 43 and coupling the second light with the second spectral distribution out of the light exit surface 43.

Furthermore, the luminescent element 4 comprises a third further surface 46 opposite to the second further surface 45. A reflecting element, such as a highly reflective mirror, may be provided at or on the third further surface 46, in which case a small air gap between the third further surface 46 and the reflective element is provided. The third further surface may also be polished to obtain at least a P3 polishing quality.

The luminescent element 4 is made of a luminescent material, suitable luminescent materials being known in the art. Non-limiting examples of luminescent materials are Ce-doped YAG, LuAG and YGdAG crystals. Furthermore, the light guide 4 is in an embodiment transparent, luminescent, light concentrating or a combination thereof, suitable materials being described above.

The light emitting device 1 further comprises a first cooling assembly 5 and a second cooling assembly 6. The first cooling assembly 5 comprises a first cooling element 52 and a first light source board 51 on which the second light source 22 is mounted. The second cooling assembly 6 likewise comprises a second cooling element 62 and a second light source board 61 on which the first light source 21 is mounted.

The first cooling assembly 5 further comprises a first holding element 54 adapted for holding the luminescent element 4. The second cooling assembly 6 likewise further comprises a second holding element 64 adapted for holding the luminescent element 4. The first holding element 54 and the first light source board 51 may be separate elements or may be made in one piece. Likewise, the second holding element 64 and the second light source board 61 may be separate elements or may be made in one piece.

Hence, the first cooling element 52 is mechanically and thermally attached to the first light source board 51 via the first holding element 54. Likewise, the second cooling element 62 is mechanically and thermally attached to the second light source board 61 via the second holding element 64.

It will be appreciated that the first holding element 54 of the first cooling assembly 5 may also have heat dissipation capabilities and, thus, may, in some embodiments, be considered to be part of the first cooling element 52 of the first cooling assembly 5. Similarly the second holding element 64 of the second cooling assembly 6 may also have heat dissipation capabilities and, thus, may, in some embodiments, be considered to be part of the second cooling element 62 of the second cooling assembly 6. Thus, it may sometimes in the following embodiments be referred to as the cooling element of the first cooling assembly 5 acting as both the first cooling element 52 and the first holding element 54. In some embodiments, the first cooling element 52 and the first holding element 54 may be made of one piece. Similarly, it may sometimes in the following be referred to as the cooling element of the second cooling assembly 6 acting as both the second cooling element 62 and the second holding element 64. In some embodiments, the second cooling element 62 and the second holding element 64 may be made of one piece.

Also, the first cooling assembly 5 and the second cooling assembly 6 are adapted for providing a clamping force or a clamping pressure on the luminescent element 4. The clamping force is in one embodiment in the range of 0.1 to 2 N/mm$^2$. The clamping pressure is in one embodiment in the range of 1.7 to 17 bar.

The first cooling assembly 5 is arranged with a surface 521 in mechanical and thermal contact with the second further surface 45 of the luminescent element 4 thereby forming a first interface. The first interface is thus an interface between the first cooling assembly 5 and the luminescent element 4. More particularly the first interface is limited to the area where the first cooling assembly 5 and the luminescent element 4 are in contact with one another. The first interface may also be described as the mutual contact surface area between the surface 521 and the second further surface 45.

The second cooling assembly 6 is arranged with a surface 621 in mechanical and thermal contact with the first further surface 44 of the luminescent element 4 thereby forming a second interface. The second interface is thus an interface between the second cooling assembly 6 and the luminescent element 4. More particularly the second interface is limited to the area where the second cooling assembly 6 and the luminescent element 4 are in contact with one another. The second interface may also be described as the mutual contact surface area between the surface 621 and the first further surface 44.

The first cooling element 52 and the second cooling element 62 are metallic cooling elements. By way of examples, the first cooling element 52 and the second cooling element 62 may be made of copper, iron or aluminum.

The first light source board 51 and the second light source board 61 may comprise a ceramic core or a metallic core.

The first interface and the second interface each comprise a flatness of less than 10 µm. A perfect flatness, i.e. zero µm, means that the interface represents a two dimensional plane.

The first interface and the second interface may comprise the same flatness. Alternatively the first interface and the second interface may comprise a different flatness.

The surface roughness of the first further surface 44 and the second further surface 45 of the luminescent element 4 may be comprised in the interval $1 \ \mu m < R_{RMS} < 5 \ \mu m$, where $R_{RMS}$ is the root mean squared surface roughness.

The surface roughness of the first further surface 44 and the second further surface 45 of the luminescent element 4 may be substantially the same. Alternatively the first further surface 44 and the second further surface 45 of the luminescent element 4 may have a different surface roughness.

As is apparent especially from FIG. 2, the first cooling element 52 is mechanically and thermally attached to the first light source board 51 via the first holding element 54. Likewise the second cooling element 62 is mechanically and thermally attached to the second light source board 61 via the second holding element 64. As previously mentioned, it may be considered that the first holding element 54 is an integrated part of the first cooling element 52 (or vice versa), in which case the first cooling element 52 is mechanically and thermally attached to the first light source board 51. Similarly, it may be considered that the second holding element 64 is an integrated part of the second cooling element 62 (or vice versa), in which case the second cooling element 62 is mechanically and thermally attached to the second light source board 61.

The light emitting device 1 further comprises an optional thermal interface material (TIM), thermal grease material or phase-change material (PCM) layer 72 provided between the first light source board 51 and the first cooling element 52 (e.g. via the first holding element 54 being part of the first cooling element in this example) and a TIM layer 71 provided between the second light source board 61 and the second cooling element 62 (e.g. via the second holding element 64 being part of the second cooling element in this example).

The light emitting device 1 may further optionally comprise a thermal interface material (TIM) layer 512 provided between the first light source board 51 and the second cooling element 62 (e.g. via the second holding element 64 being part of the second cooling element) and a TIM layer 612 provided between the second light source board 61 and the first cooling element 52 (e.g. via the first holding element 54 being part of the first cooling element).

The light emitting device 1 further comprises an optional thermal interface material (TIM) layer 73 provided between the luminescent element 4 and the first cooling element 52 and a TIM layer 74 provided between the luminescent element 4 and the second cooling element 62.

At least a part of at least one of the first cooling element and the second cooling element, or rather the first holding element and the second holding element, may comprise a metallic coating. The metallic coating may comprise a thickness of 100 to 200 nm. The metallic coating may be an aluminum coating.

The light emitting device 1 further comprises an alignment element 80 adapted for providing an optical interface to an external device, such as an optical engine or interface of a digital projector.

Alternatively, the first cooling assembly 5 may be made as one solid metal element, on which an optical interface to an external device, such as an optical engine or interface of a digital projector is arranged. Such a configuration would yield a particularly low thermal resistance between the luminescent element 4 and an external cooling element such as a heat sink element 53, 63 as will be described further below.

Figure 3:
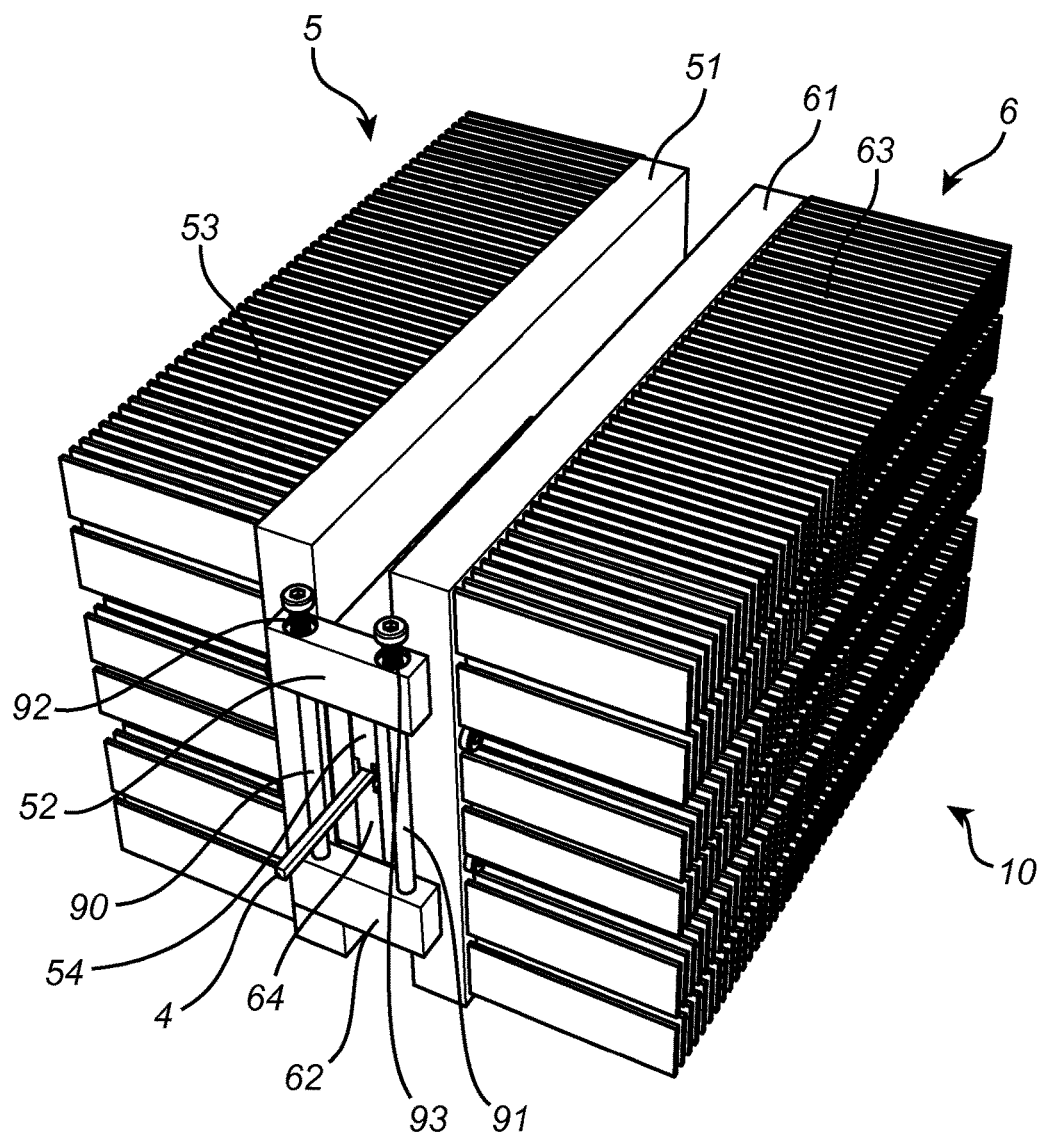
FIG. 3 shows a perspective view of a light emitting device according to the invention and comprising a guiding pin and a spring.

With reference to FIG. 3 a light emitting device 10 according to a second embodiment of the invention is shown. The light emitting device 10 differs from that described above with reference to FIGS. 1 and 2 in that it comprises the following additional and optional elements: a guiding element, a spring element and heat sink elements. It is noted that in other embodiments these additional elements may be present either alone or in any suitable combination.

The light emitting device 10 in this embodiment further comprises at least one guiding element, in the embodiment shown being guiding pins 90, 91 adapted for aligning the first cooling assembly 5 and the second cooling assembly 6 with respect to the luminescent element 4. The light emitting device 10 comprises three guiding pins of which one is not visible on FIG. 3 as it is arranged at an end of the first and second cooling assemblies 5 and 6 opposite to the guiding pins 90 and 91. Alternatively the light emitting device may comprise two guiding elements or more than three guiding elements.

The light emitting device 10 in this embodiment further comprises at least one spring element 92, 93 adapted for providing a clamping force on the luminescent element 4. The light emitting device 10 comprises three spring elements, one for each of the guiding elements. One of the spring elements is not visible on the figure. Alternatively the light emitting device may comprise two spring elements or more than three spring elements. The spring elements may be any suitable type of springs, such as e.g. a helical spring.

Furthermore, in this embodiment the first light source board 51 and the second light source board 61 each comprises a heat sink element 53 and 63, respectively.

Figure 4:
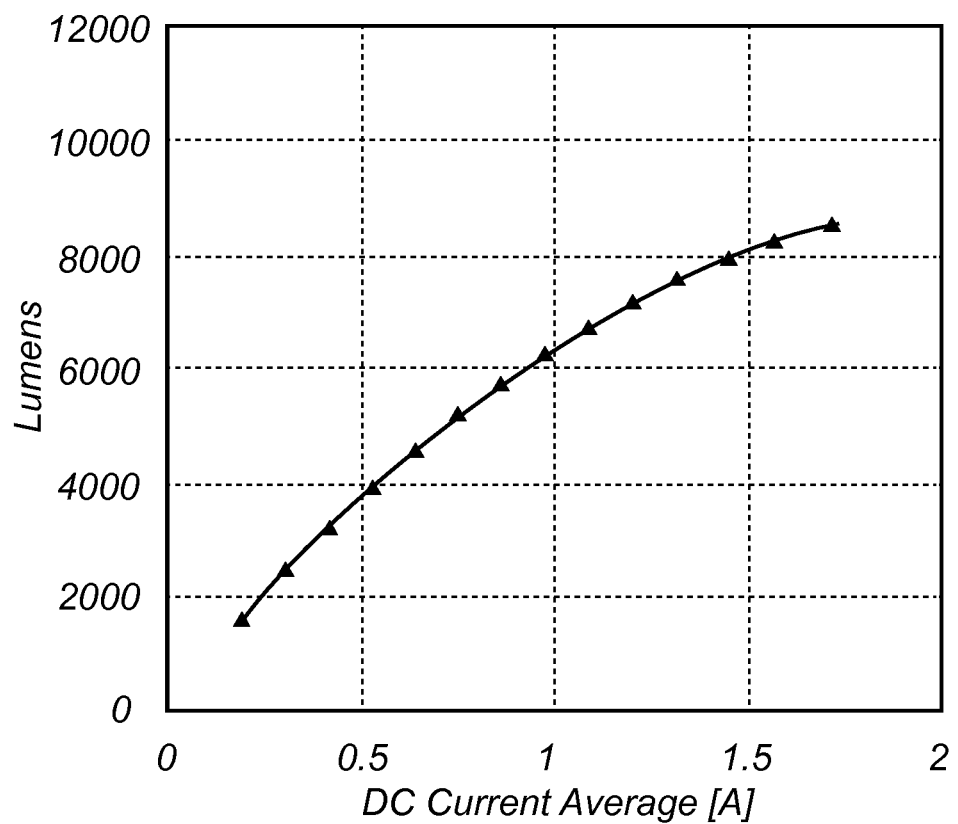
FIG. 4 is a graph illustrating the optical performance of a light emitting device according to the invention measured in lumens as a function of the current applied to the light sources.
Figure 5:
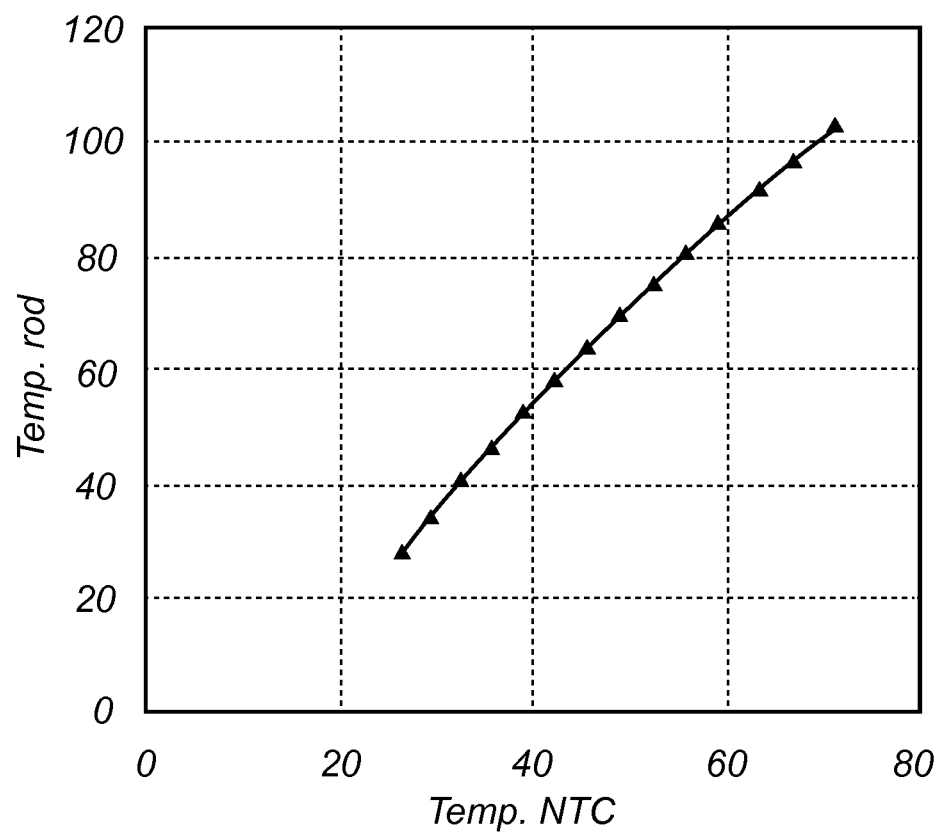
FIG. 5 is a graph illustrating the temperature of the luminescent element of a light emitting device according to the invention as a function of the temperature of the board element as measured by a negative temperature coefficient (NTC) thermistor. The board element temperatures shown in FIG. 5 are the temperatures that have been reached during operation at the currents shown in FIG. 4, such that i.e. 25° C. board element temperature is coupled to a current of 0.25 A through the light sources, and a board element temperature of 75° C. is coupled to a current of 1.7 A through the light sources.
Figure 6:
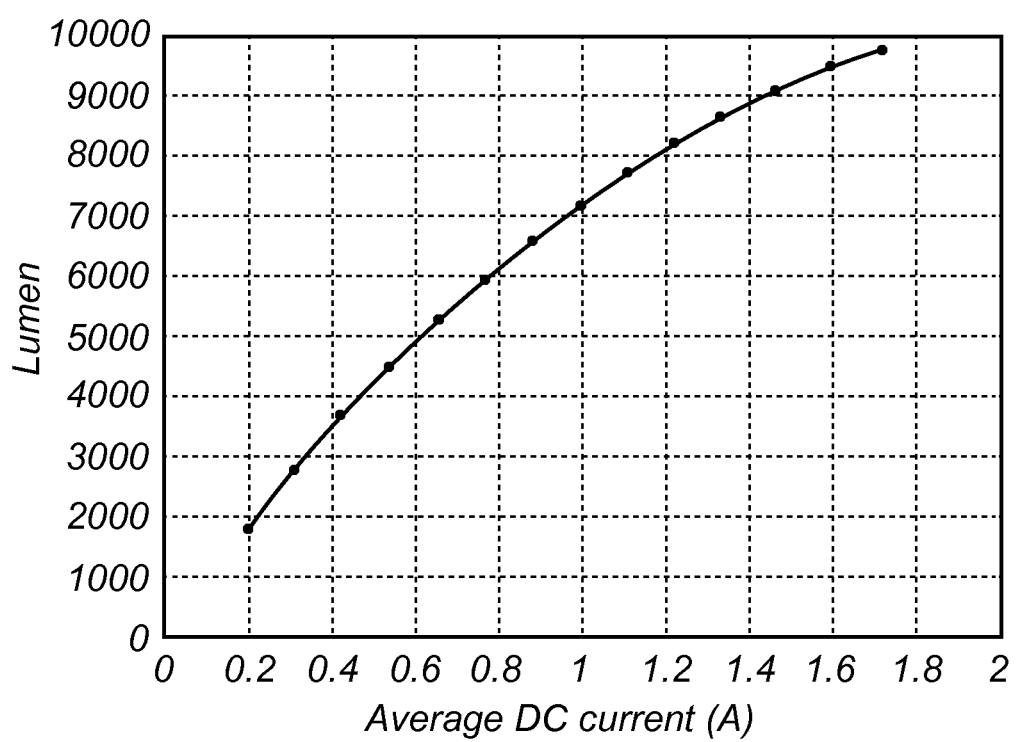
FIG. 6 is a graph illustrating the optical performance of a light emitting device according to the invention where the cooling elements have been provided with an aluminum coating measured in lumens as a function of the current applied to the light sources.

FIGS. 4, 5 and 6 show three different graphs illustrating the performance of a light emitting device according to the invention.

FIG. 4 illustrates the optical performance or optical output in lumens as a function of applied current (in Amperes) of a light emitting device according to the invention in which the cooling elements have not been coated with a metallic coating wherein the current is applied to the first and second light source in a series connection through the first and second light source boards. As may be seen no thermal roll-over (d$\Phi$/dI<0, wherein $\Phi$ is the optical output and I the applied current) is observed, which means that no thermal quenching occurs. The "droop" in the curve can be fully attributed to the droop-curve of the used LEDs as the wall-plug efficiency of the LEDs decreases with the current density, which is a very well understood and known fact within the art. The graph of FIG. 4 shows that the optical and thermal performance of a light emitting device according to the invention is very good, or at least improved.

FIG. 5 illustrates the temperature of the luminescent element (Temp. rod) as a function of the temperature of the light source board (Temp. NTC) for a light emitting device of the same type as for FIG. 4. The temperature of the luminescent element and the temperature of the light source board were measured by the negative temperature coefficient, NTC thermistor. The temperatures of the light source board shown are the temperatures that have been reached during operation at the currents in the graph of FIG. 4, i.e. 25° C. light source board temperature is coupled to a current of 0.25 A through the light sources, and a light source board temperature of 75° C. is coupled to a current of 1.7 A through the light sources. It may be seen, that even at maximum current, the temperature of the light source board is approximately 75° C., whereas the temperature of the luminescent element reaches only 105° C., and thus well below 150° C. as it is desired and required in most applications.

FIG. 6 illustrates the optical performance or optical output in Lumens of a light emitting device according to the invention, in which the cooling elements have been coated with an aluminum coating being 100 to 200 nm in thickness, as a function of applied current (Average DC current in Amperes) applied to the first and second light source through the first and second light source boards. The light sources are in this case blue LEDs and the luminescent element is Ce-doped.

As the light from the blue LEDs is radiated as a Lambertian emitter, part of the light will strike the luminescent element at non-preferred angles. Some of the light will pass through the luminescent element as a certain path length is required for full conversion of the blue LED light inside the luminescent element. Especially if the Ce-concentration which is used in the luminescent element is below 0.5 atomic %, this becomes an issue, as the absorption length reduces with reduced Ce-concentrations. The aluminum coating is very well suited for reflecting blue light. So part of the blue light that is transmitted through the luminescent element is reflected back into the luminescent element, thus providing an extra (recycling) opportunity for absorption and conversion. The result of this enhancement can be seen in the graph of FIG. 6 as compared to the graph of FIG. 4. At identical driving conditions, the peak lumen output shows a gain of about 15%. Therefore it is advantageous to provide such a coating, as copper (normally) is almost fully absorbing the leaked blue light, whereas the reflectivity of the aluminum coating is above 90% for blue light. Furthermore, the coating layer has already a very good reflectivity for a coating thickness of only 100-200 nm. Experiments show that a thicker layer would not yield a better reflectivity. Furthermore, the aluminum layer is so thin that the thermal cooling properties of the cooling assembly are only altered in an extremely minor way, thus no reduced cooling properties/capacity are/is to be observed. The provision of such a coating layer is especially of interest if single-crystal luminescent elements are being used, as during growth of these crystals, the maximum achievable Ce-concentration is low (i.e. considerably smaller than 0.5 atomic %) compared to sintered crystals with which concentrations of up to 3 atomic % Ce may be obtained.

Figure 7:
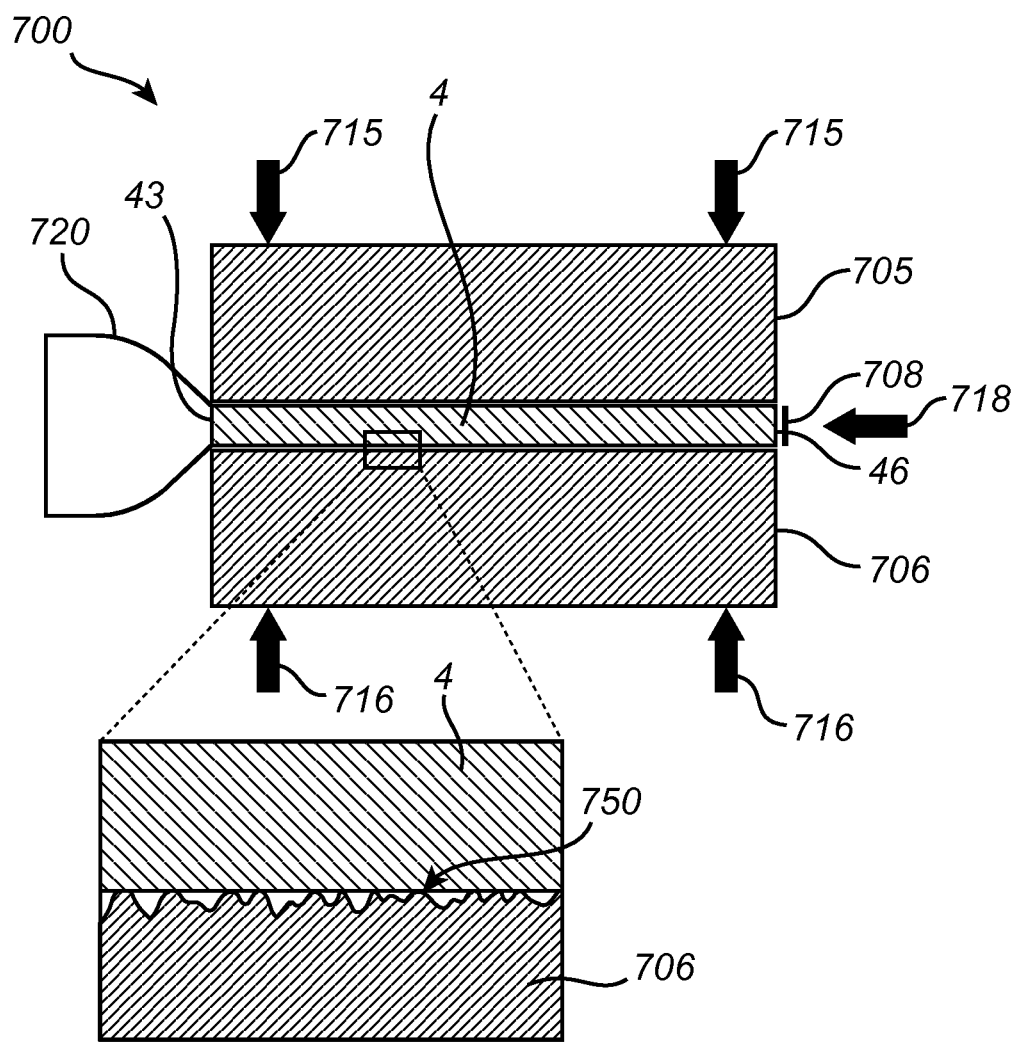
FIG. 7 shows a side view of a light emitting device according to one embodiment.

With reference to FIG. 7, a light emitting device according to one embodiment is described.

FIG. 7 shows a side view of a light emitting device 700 which may be generally equivalent to the light emitting device 1 described with reference to FIGS. 1 and 2 except that a polymer coating 750 is provided at the surface of the cooling assembly (denoted 6 in FIGS. 1 and 2) in thermal and mechanical contact with the luminescent element 4.

The light emitting device 700 includes a luminescent rod 4 which is mounted between at least part of a first cooling assembly 705 and at least part of a second cooling assembly 706. The first cooling assembly 705 and the second cooling assembly 706 may be equivalent to the first and second cooling assemblies 5 and 6, respectively, described with reference to FIGS. 1 and 2. In FIG. 7, only a part of the first cooling assembly 705 and a part of the second cooling assembly 706 are represented. With reference to FIGS. 1 and 2, the first cooling assembly 5 may include the first cooling element 52, the holding element 54 and the first light source board 51. In FIG. 7, reference numeral 705 may be considered to denote at least the first holding element of the first cooling assembly but possibly also the first cooling element of the first cooling assembly (i.e. the first holding element and the first cooling element together). Similarly, reference numeral 706 may be considered to denote at least the second holding element of the second cooling assembly but possibly also the second cooling element of the second cooling assembly. For convenience, it will in the following be referred generally to the first cooling assembly 705 and the second cooling assembly 706. It will be appreciated that in this context, the first cooling element 52 and the first holding element 54 of the first cooling assembly 5 (or 705) may form a single mechanical block while the second cooling element 62 and the second holding element 64 may form another single mechanical block.

As previously described, FIG. 7 illustrates that the surface of the second cooling assembly 706 in thermal and mechanical contact with the luminescent element/rod 4 is, in addition to have a certain roughness, coated with a polymer layer 750.

Generally, the respective surfaces of the cooling blocks 705 and 706 in contact with the luminescent rod 4 have a certain roughness to improve thermal contact with the luminescent rod 4 and reduce (and possibly) avoid optical contact in order to increase (and possibly optimize) the light output from the luminescent rod 4.

The first and second cooling assemblies 705 and 706 (or the cooling blocks 705 and 706) may be kept in place and clamped against the luminescent rod 4 by means of force applied as shown in FIG. 7 by the vertical thick black arrows 715 and 716.

FIG. 7 also illustrates that an optical element 708 such as a mirror may be arranged at the end 46 of the luminescent rod 4 that is opposite to the light exit surface 43, i.e. at the third further surface 46 as referred to in the description of FIG. 2.

The light emitting device 700 shown in FIG. 7 is also equipped with a compound parabolic concentrator (CPC) 720 at the light exit surface 43 in order to extract the light output from the light exit surface 43 to e.g. an external device such as e.g. a projection system (of a beamer for instance). The optical element or mirror 708 may be maintained in place by means of a force applied to it, such as illustrated in FIG. 7 by the horizontal black arrow 718.

It will be appreciated that, in general, the luminescent rod 4 may tend to crawl out of the cooling blocks 705 and 706 because of thermal cycling, the (small) force applied at the optical element/mirror 708 and the presence of micro/macro slip at the interface between the luminescent rod 4 and each one of the cooling blocks 705 and 706. In particular, if the optical element/mirror 708 was removed, the luminescent rod 4 may crawl outwards or inwards and there would be a reduced and possibly no control of the movement of the luminescent rod 4. Crawling (inwards or outwards) would raise the risk of making the light emitting device to fail. This risk is reduced by means of the polymer coating 750 provided at the surface of the second cooling assembly 706 that is in thermal and mechanical contact with the luminescent element 4.

Although FIG. 7 shows that the second cooling assembly 706 is provided with a polymer coating, it will be appreciated that, alternatively, the surface of the first cooling assembly 705 arranged in thermal and mechanical contact with the luminescent element 4 may be equipped with a polymer coating instead or that each one of the first cooling assembly 705 and the second cooling assembly 706 has such a surface in thermal and mechanical contact with the luminescent element 4 provided with a polymer coating.

The polymer coating may for example be a (fluorinated) polymeric coating, such as e.g. PTFE, PFA, or FEP. Such material provides a relatively low friction coefficient, combined with a relatively low shear module and comparatively high temperature resistance. A lower friction coefficient reduces the crawling effect because it decouples the luminescent rod 4 from the rod holders (or holding elements) of the cooling assemblies mechanically while a lower shear modulus allows for (minor or small) deformations in the polymer coating 750 that prevent hysteresis between the luminescent rod 4 and the rod holders of the first and second cooling assemblies 705 and 706. The flexibility of the polymeric layer 750 at the interface therefore prevents, or at least reduces, slip and also reduces, and possibly avoids, the outward or inward crawling of the luminescent rod 4. In other words, the polymer layer 750 enables that the luminescent rod 4 is maintained at its initial position during the lifetime of the light emitting device 700.

The thickness of the polymeric layer 750 may be designed or reduced to have negligible influence on thermal performance, i.e. on the thermal exchange between the luminescent rod 4 and the cooling assembly 705.

In addition, the polymeric layer 750 may be designed to alleviate the requirement on roughness at the interface between the luminescent rod 4 and the respective holding elements (or cooling elements if they also have the holding function) of the first and second cooling assemblies 705 and 706. The polymeric layer 705 may adjusts (i.e. may become conformal) with the roughness of these interfaces. The possibility to increase the contact surface between the cooling assemblies 705 and 706 and the luminescent rod 4 via the polymeric coating 750 allows for higher roughness values to be used at the interface surfaces of the rod holders of the first and second cooling assemblies 705 and 706, yet still providing similar thermal contact area with the luminescent rod 4 for heat transfer. The use of a polymer coating at these interfaces may also be advantageous in that the optical contact with the luminescent rod 4 may be reduced.

Although applying a polymeric layer to the rod holders of at least one of the cooling assemblies 705 and 706 may, as such, introduce an additional manufacturing step and thereby increase cost, this may be compensated by a lower production cost in reducing the requirement level on the roughness.

The polymeric layer 750 may also add benefit of electrical insulation between the circuit board of the light source (not shown in FIG. 7) and the rod holders of the first and/or second cooling assemblies 705 and 706. The use of the polymeric layer 750 may therefore also reduce the requirement on the dielectric layer provided on the circuit boards of the first and second light sources, thereby increasing the heat transfer.

Figure 8:
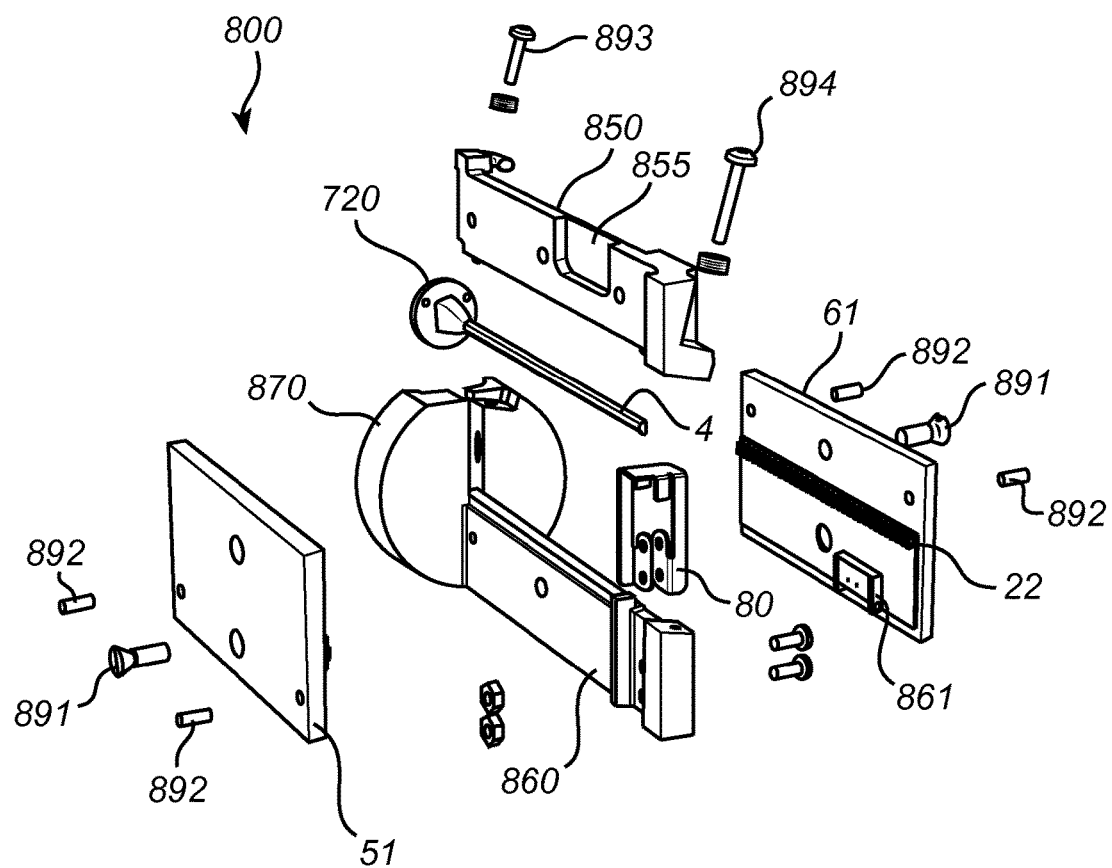
FIG. 8 shows an exploded view of a light emitting device according to one embodiment.

With reference to FIG. 8, a light emitting device according to another embodiment is described.

FIG. 8 shows an exploded view of a light emitting device 800 which may be generally equivalent to the light emitting device 1 described with reference to FIGS. 1 and 2 except that the mechanical construction of the cooling assemblies 5 and 6 are different. Further, FIG. 8 illustrates that the cooling elements of the two cooling assemblies may be symmetrical relative to the luminescent element 4, i.e. substantially similar on each side of the luminescent element 4.

FIG. 8 shows a light emitting device 800 including a luminescent rod 4 to be fixed (or clamped) between a first block 850 (which may be referred to as the first holding element and/or the first cooling element) and a second block 860 (which may be referred to as the second holding element and/or the second cooling element).

The light emitting device 800 includes also a first light source board 51 comprising a first light source (not visible in this figure) for input of light to the luminescent element 4 via a side surface of the luminescent element 4, as described with reference to FIGS. 1 and 2, and a second light source board 61 comprising a second light source 22 for input of light to the luminescent element 4 via another (opposite) side surface of the luminescent element 4, as described with reference to FIGS. 1 and 2.

The second light source board 61 may be equipped with a circuit board 861 for electrically controlling the second light source 22. In the present example, the second light source 22 may be a LED string. The second block 860 may be shaped such that the circuit board 861 may be lodged between the heat dissipating plate of the second light source board 61 and the second block 860 (not visible in this figure). This aspect is illustrated for the corresponding parts of the light emitting device 800 and in particular the shape of the first block 850 including an inward portion or recess 855 for lodging or inserting the corresponding circuit board (not visible) of the first light source board 51.

In the present example, the light emitting device is also equipped with a CPC 720, such as described with reference to FIG. 7.

In the present embodiment, the cooling element 850 of the first cooling assembly may act as both cooling element and rod holding element. Similarly, the cooling element 860 of the second cooling assembly may act as both cooling element and rod holding element. In particular, the first cooling element 850 and the second cooling element 860 provide similar heat spreading capability on each side of the luminescent element 4. As illustrated in FIG. 8, the cooling element 850 of the first cooling assembly has a similar shape as the cooling element 860 of the second cooling assembly.

It will be appreciated that, although it is herein referred to the cooling elements of the respective first and second cooling assemblies, the present embodiment may also be defined by referring to the rod holding elements of the respective first and second cooling assemblies which, in particular, may be symmetrical in shape with respect to the luminescent element 4. The rod holding elements may also include thermally conductive material for heat dissipation from the luminescent element 4 to the ambient via the cooling elements and the light source boards.

In the present embodiment, the parts or elements of the cooling assemblies arranged on each side of the luminescent element 4 are symmetrical in design, i.e. are similar in shape and material. This simplifies also the manufacturing and the assembly of the light emitting device. More generally, in the present embodiment, the parts or elements of the cooling assemblies arranged on each side of the luminescent element 4 provide the same heat spreading capability.

Further, the symmetry in heat spreading capability reduces, and possibly eliminates, the need for the rod holders and/or cooling elements 850 and 860 to be thermally connected to both the first light source board 51 and the second light source board 61 as they perform equally in heat dissipation. The symmetry also creates leniency in tolerances as the tolerance trains is shortened as compared to a scenario in which the luminescent rod 4 needs to be connected to a first rod holder thermally connected to a first light source board which in turn needs to be connected to a second rod holder itself thermally connected to a second light source board.

FIG. 8 illustrates an embodiment in which a first (cooling) assembly and a second (cooling) assembly 860 are formed by two symmetrical halves (with respect to the luminescent element 4) each made up of one respective light source board 51, 61 and one respective rod holder/cooling element 850, 860.

In the embodiment shown in FIG. 8, the first cooling element or rod holding element 850 is thermally connected to the first (left) light source board 51 and the second cooling element or rod holding element 860 is connected to the second (right) light source board 61. In the present embodiment, it is not necessary that the two light source boards 51 and 61 are thermally connected to each other as it would be the case if the cooling elements/rod holding elements 850 and 860 were not symmetrical. The rod holders and/or cooling elements 850 and 860 may be joined in a similar way as shown in FIG. 1, wherein the luminescent rod 4 becomes fixed (or clamped) between the first cooling element/rod holding element 850 and the second cooling element/rod holding element 860.

In the present embodiment, the rod holding elements may be considered to be thermally equal except for the interface ring 870 arranged at the front side of the second (bottom) rod holding element 860. The light emitting device 800 may be assembled using a number of fastening means like screws such as illustrated in FIG. 8. In particular, the first and second light source boards may be laterally fixed against the first block 850 and the second block 860 using one central screw 891 and two slotted holes for dowels 892.

The light emitting device 800 may also be equipped with a number of screws 893, 894 for applying a clamping force on the luminescent rod 4. Depending on the force applied on each of these screws, the clamping force may be varied between one end of the luminescent rod and its opposite end.

Further, as illustrated in FIG. 8, the screws 893 and 894 applying a force on the holding/cooling element 850 to clamp the luminescent rod 4 may be tilted with respect to a vertical plane, or rather a plane in which the holding/cooling element 850 of the light emitting device 800 extends. In other words, the fixation elements or screws 893 and 894 are mounted such that their axis intersects with the axis of the luminescent rod 4, thereby preventing tilt and subsequent undesired pressure distribution.

It will be appreciated that the rod holding elements 850 and 860 may also include alignment features for aligning the luminescent rod 4 in relation to the rod holding elements themselves. For example, the rod holding elements 850 and 860 may include notches (or other types of alignment features), as angular or V-shaped cuts or indentations, at their respective edges being in thermal contact with the luminescent rod 4. This may reduce the number of fixation elements (or screws) required for assembling the light emitting device, while still providing a sufficient thermal contact.

Figure 9:
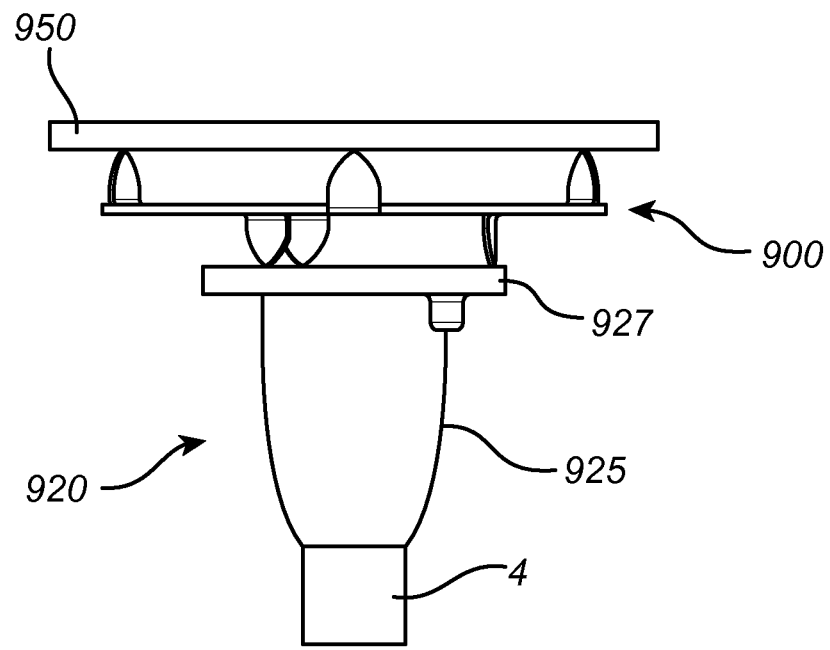
FIG. 9 shows a side view of the connection of a light emitting device with an external device via an intermediate element.

FIG. 9 shows a side view of the connection of a light emitting device with an external device via an intermediate element.

FIG. 9 shows the connection between an external device, or at least a module interface ring 950 of such an external device, and part of a light emitting device such as any one of the light emitting devices described in the preceding embodiments, and in particular a CPC 920 optically connected to a luminescent rod 4 of such a light emitting device.

In the present embodiment, an interface, such as a light exit window 927 of the CPC 920 is connected to the interface ring 950 of the external device via an intermediate element 900.

As previously mentioned, the luminescent element 4 may be subject to crawling for different reasons. In the present embodiment, an intermediate element 900 for connection of the light emitting device to an external device is provided to compensate for the crawling. The intermediate element 900 may act as a spring and may be used on the CPC side without the risk of bending stresses at the interface between the CPC 920 and the luminescent rod 4 and with sufficient stiffness to keep the luminescent rod 4 in an accurate position against a reference plane, for example a mirror positioned at an opposite end of the luminescent rod, as for example illustrated in FIG. 7.

The use of an intermediate element acting as a spring provides a rather cheap and effective solution to compensate for crawling, without using space inside the light emitting element itself. It is also a more reliable solution than using other attaching means.

Figure 10:
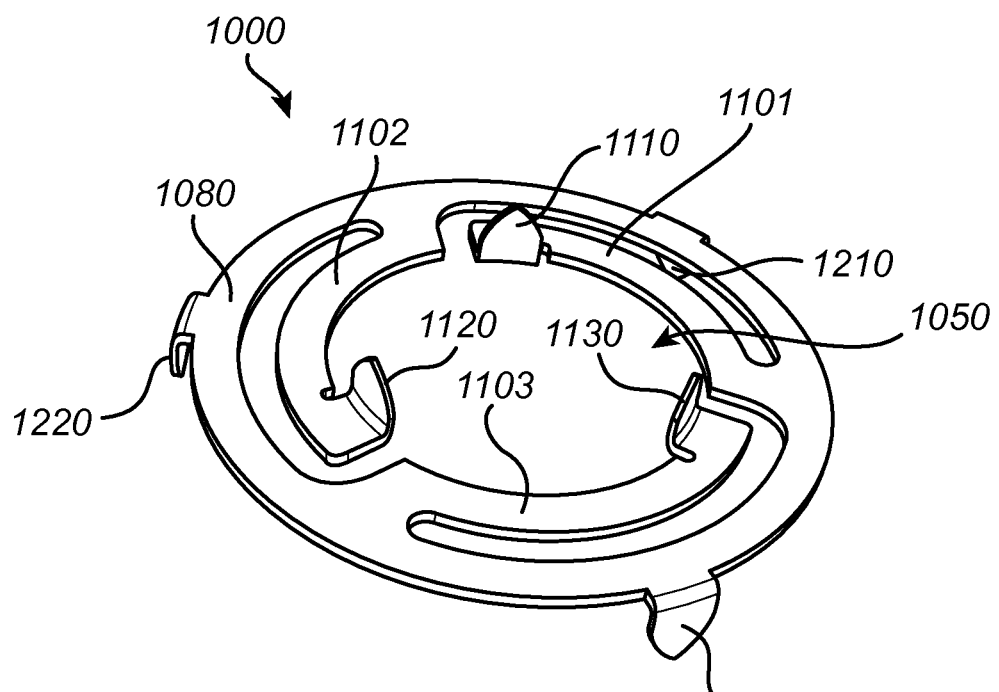
FIG. 10 shows a perspective view of an intermediate element according to one embodiment.

FIG. 10 shows a perspective view of an intermediate element 1000 according to one embodiment.

The intermediate element 1000 may be used as the intermediate element 900 shown in FIG. 9. The intermediate element 1000 acts as a spring and is made from a single piece of steel sheet in this example.

The intermediate element 1000 is circular and comprises a center hole 1050 allowing light to pass through it. The intermediate element 1000 is shaped as a ring 1080 wherein at the periphery of the ring 1080 at least three contact points 1210, 1220 and 1230, for example in the form of three blades or three rigid flaps, extend in a first direction from a plane in which the ring is located. The three contact points 1210, 1220 and 1230 may be distributed at equal angular distance from the center of the ring for improved mechanical stability. The intermediate element 1000 may also comprise three portions 1101, 1102 and 1103 located within the ring 1080. Each of these portions may be attached at one end to the ring 1080 and may be free-hanging at the other end as three blades at which three corresponding contact points 1110, 1120 and 1130, for example in the form of three blades or three rigid flaps, extend from their respective three-hanging portions. These three additional contact points 1110, 1120 and 1130 may extend in a second direction opposite to the first direction with respect to the plane in which the ring is located.

As a result, referring to FIG. 9, a first group of three contact points 1210, 1220 and 1230 may be directly in contact with the interface ring 950 of the external device and a second group of three contact points 1110, 1120 and 1130 may be directly in contact with the exit window 927 of the CPC 920.

The intermediate element 1000 may act as a spring and its elastic behavior may be tuned by adjusting the length of the spring portions versus the overall size of the intermediate element 1000. It may for example be tuned either by adjusting the width of the spring blades, the length of the spring blades, or the thickness of the sheet used.

As mentioned above, the intermediate element has three contact points on each side to ensure an improved contact with the CPC exit widow 927 (on one side) and a metal interface (e.g. to projector housing) ring 950 (on the other side). It will be appreciated that more than three contact points may be used on each side of the ring 1080. Further, the number of contact points may not be equivalent on each side of the ring 1080.

The intermediate element 1000 may for example be made of one-piece sheet and may be manufactured by die-cutting, or stamping.

The person skilled in the art realizes that the present invention by no means is limited to the preferred embodiments described above. On the contrary, many modifications and variations are possible within the scope of the appended claims. For example, and irrespective of the embodiment, it would be feasible to mount both the first and the second light source 21 and 22 on either the first light source board 51 or the second light source board 61 or in the alternative to simply omit either the first light source 21 or the second light source 22. In addition, it would even be feasible to omit also either the first light source board 51 or the second light source board 61.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
a first light source and a second light source, the first light source and the second light source being adapted for, in operation, emitting first light with a first spectral distribution,
a luminescent element comprising a first light input surface, a second light input surface, a light exit surface extending in an angle different from zero to both the first light input surface and the second light input surface, a first further surface and a second further surface,
the luminescent element being adapted for receiving the first light with the first spectral distribution at the first light input surface and the second light input surface, converting at least a part of the first light with the first spectral distribution to second light with a second spectral distribution, guiding the second light with the second spectral distribution to the light exit surface and coupling the second light with the second spectral distribution out of the light exit surface,
the light emitting device further comprising a first cooling assembly and a second cooling assembly, the first cooling assembly comprising a first cooling element and a first light source board on which one of the first light source and the second light source is mounted, and the second cooling assembly comprising a second cooling element and a second light source board, on which the other one of the first light source and second light source is mounted; and
characterized by:
one of the first cooling assembly and the second cooling assembly being arranged with a surface in mechanical and thermal contact with the first further surface of the luminescent element thereby forming a first interface and the other of the first cooling assembly and the second cooling assembly being arranged with a surface in mechanical and thermal contact with the second further surface of the luminescent element thereby forming a second interface,
the first interface and the second interface comprising a flatness of less than 10 μm, and
the root mean squared surface roughness, $R_{RMS}$, of the first further surface and the second further surface of the luminescent element being comprised in the interval 1 μm<$R_{RMS}$<5 μm.

2. A light emitting device according to claim 1, wherein at least the surface of said one of the first cooling assembly and the second cooling assembly in mechanical and thermal contact with the first further surface and the second further surface at the first interface or the second interface is arranged with a polymeric coating.

3. A light emitting device according to claim 2, wherein the polymeric coating is fluorinated, wherein the coating includes any of polytetrafluoroethylene, perfluoroalkoxy resin or fluorinated ethylene propylene.

4. A light emitting device according to claim 1, wherein the first cooling element and the second cooling element are metallic heat sink elements, wherein at least a part of at least one of the first cooling element and the second cooling element comprises a metallic coating wherein the metallic coating comprises a thickness of at least 100 to 200 nm and/or is an aluminum or a silver alloy coating.

5. A light emitting device according to claim 1, wherein the first cooling assembly and the second cooling assembly have similar heat dissipation capabilities, wherein the first cooling element of the first cooling assembly and the second cooling element of the second cooling assembly have similar structural shapes, and wherein the first cooling element of the first cooling assembly and the second cooling element of the second cooling assembly are structurally symmetrical relative to the luminescent element.

6. A light emitting device according to claim 1, and further comprising an alignment element adapted for providing an optical interface to an external device.

7. A light emitting device according to claim 1, wherein at least one of the first light source board and the second light source board comprises a heat sink element.

8. A lamp, a luminaire, or a lighting system comprising a light emitting device according to claim 1, the lamp, luminaire and system being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

9. A light emitting device according to claim 1, wherein the first cooling element is mechanically and thermally attached to the first light source board and wherein the second cooling element is mechanically and thermally attached to the second light source board.

10. A light emitting device according to claim 1, wherein a thermal interface material, thermal grease material or phase-change material layer is provided between one or more of:
   a) at least one of the first light source board and the first cooling element and the second light source board and the second cooling element, and
   b) the luminescent element and at least one of the first cooling element and the second cooling element.

11. A light emitting device according to claim 1, wherein the first cooling assembly and the second cooling assembly are adapted for providing a clamping force on the luminescent element, wherein the clamping force is in the range of 0.1-2 N/mm² and/or the clamping pressure in the range of 1.7 bar to 17 bar.

12. A light emitting device according to any one of the above claims, and further comprising at least one guiding element adapted for aligning the first cooling assembly and the second cooling assembly with respect to the luminescent element and at least one spring element adapted for providing a clamping force on the luminescent element.

13. A light emitting device according to claim 1, wherein at least one of the first light source board and the second light source board comprises a copper core or a ceramic core.

14. A light emitting device according to claim 1, wherein at least one of the first light input surface, the second light input surface and the light exit surface of the luminescent element are polished to obtain at least a P3 polishing quality, and wherein the root mean squared surface roughness, $R_{RMS}$, of the first further surface and the second further surface the luminescent element being comprised in the interval $2\ \mu m < R_{RMS} < 5\ \mu m$.

15. A system according to claim 8, further comprising a compound parabolic concentrator optically coupled to the light exit surface of the light emitting device, wherein an exit window of the CPC is connected to another device via an intermediate element, wherein the intermediate element comprises three contact points to contact the light exit surface and three contact points to contact said another device, and wherein the intermediate element is configured to act as a spring.

* * * * *